July 6, 1926.

W. C. BOSWELL

GARDEN IMPLEMENT

Filed Oct. 22, 1925

1,591,274

Patented July 6, 1926.

1,591,274

UNITED STATES PATENT OFFICE.

WILLIAM C. BOSWELL, OF BALTIMORE, MARYLAND.

GARDEN IMPLEMENT.

Application filed October 22, 1925. Serial No. 64,140.

This invention relates to garden tools such as are used for cultivating around flowers and the like.

One object of the invention is to provide an improved tool of the hoe type wherein the hoe blade may be readily detachable and in which the tool, when the blade is detached, may be used to loosen earth or open the same for the setting out of a plant.

A second object of the invention is to provide a tool of this description of very simple character and wherein the detachable blade is secured on the tool by simple means.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1:
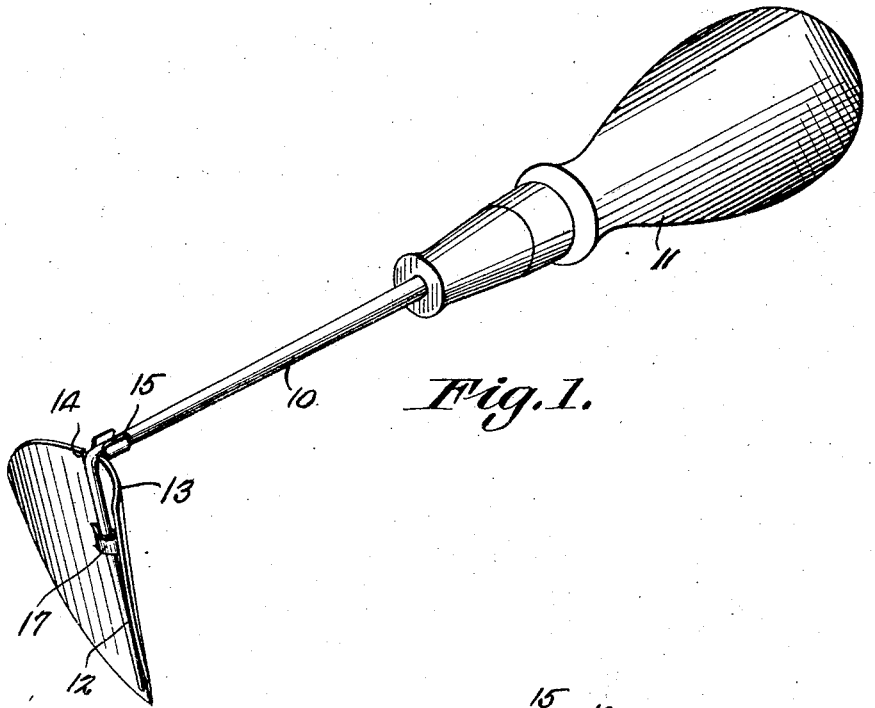
Figure 1 is a perspective view of the tool showing the detachable blade applied thereto.
Figure 2:
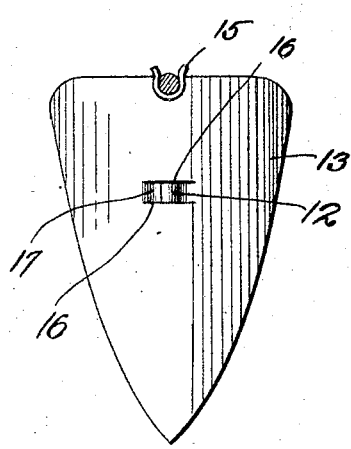
Figure 2 is a section through the tool shank showing the blade in position.

The tool consists of a shank 10 whereon is preferably mounted a handle 11 suitable for gripping in one hand. The shank 10 may be made tapering from end to end and its forward end is bent down to form a point or dibble 12. Preferably the hoe blade 13 is of shield shaped outline as may be seen in Figure 2. At its upper edge the blade is provided with a notch 14, the material stamped out from the notch being carried rearwardly along the shank as at 15 so as to form a U-shaped clip. This clip is preferably made to extend little more than half way around the underside of the shank so that the flaring upper edges of the clip contract slightly and thus grip the blade 13 firmly to the shank. About one third of the way down the blade 13, there is provided a pair of slits 16 so that the material between these slits may be struck out forwardly to form a loop 17, which engages around the point or dibble 12 and thus holds the blade from rocking sideways. Of course the blade may be of this proportion and may either be flat or curved as shown in the present case.

In use in working around flowers and for hoeing the blade is put on and to be used as an ordinary one handed hoe. On the contrary if desirable for other purposes in cultivation the blade may be very quickly slipped off and the point 12 utilized for working the ground.

There has thus been provided a simple and efficient device of the kind described and one for the purpose specified.

Having thus described the invention, what is claimed as new, is:

In a device of the kind described, a shank having its forward end turned down to form a supporting point, a blade having a loop formed intermediate its top and bottom parts and slidable on the point of the shank, said blade having a substantially U-shaped clip formed on the blade at its top edge engaging the shank adjacent the point portion thereof.

In testimony whereof I affix my signature.

WILLIAM C. BOSWELL.